United States Patent
Wölfert et al.

(10) Patent No.: US 7,871,594 B2
(45) Date of Patent: Jan. 18, 2011

(54) REACTOR AND METHOD FOR PRODUCTION OF HYDROGEN SULPHIDE

(75) Inventors: Andreas Wölfert, Bad Rappenau (DE); Herald Jachow, Bensheim (DE); Heinz Drieβ, Ludwigshafen (DE)

(73) Assignee: BASF SE, Ludwigshafen (DE)

( * ) Notice: Subject to any disclaimer, the term of this patent is extended or adjusted under 35 U.S.C. 154(b) by 0 days.

(21) Appl. No.: 12/523,227

(22) PCT Filed: Jan. 10, 2008

(86) PCT No.: PCT/EP2008/050231
§ 371 (c)(1),
(2), (4) Date: Jul. 15, 2009

(87) PCT Pub. No.: WO2008/087086
PCT Pub. Date: Jul. 24, 2008

(65) Prior Publication Data
US 2010/0015036 A1 Jan. 21, 2010

(30) Foreign Application Priority Data
Jan. 16, 2007 (EP) .................................. 07100588

(51) Int. Cl.
*C01B 17/16* (2006.01)
(52) U.S. Cl. ...................................... 423/563; 423/564
(58) Field of Classification Search .................. 423/563, 423/564; 422/129, 160, 161, 224, 231, 292
See application file for complete search history.

(56) References Cited

U.S. PATENT DOCUMENTS

| 1,623,942 | A | * | 4/1927 | Henwood ................... 423/563 |
| 1,700,578 | A | | 1/1929 | Bacon et al. |
| 2,214,859 | A | | 9/1940 | Maude et al. |
| 2,863,725 | A | | 12/1958 | Maude et al. |
| 2,876,070 | A | | 3/1959 | Roberts |
| 2,876,071 | A | | 3/1959 | Updegraff |

(Continued)

FOREIGN PATENT DOCUMENTS

DE 558432 9/1932

(Continued)

OTHER PUBLICATIONS

Zimmermann, "Schwefelwasserstoff-Entwickler fuer das Laboratorium", Angew. Chem., vol. 74, 1962, No. 4, p. 151.

(Continued)

*Primary Examiner*—Timothy C Vanoy
(74) *Attorney, Agent, or Firm*—Connolly Bove Lodge & Hutz LLP

(57) ABSTRACT

The present invention describes a reactor (1) for continuously preparing hydrogen sulfide $H_2S$ from hydrogen and sulfur, comprising a distributor device (15) for distributing gaseous hydrogen in a sulfur melt (9) present at least in a lower part of the reactor. The distributor device (15) is arranged in the sulfur melt (9) and comprises a distributor plate (16) which is arranged in the reactor (1) and has an edge (17) extending downward and, if appropriate, has passage orifices (19). The hydrogen from a hydrogen bubble which forms below the distributor plate (16) is (for example through the passage orifices (19)) distributed in the sulfur melt (9) via the distributor plate (16).

4 Claims, 2 Drawing Sheets

U.S. PATENT DOCUMENTS

Figure 1:
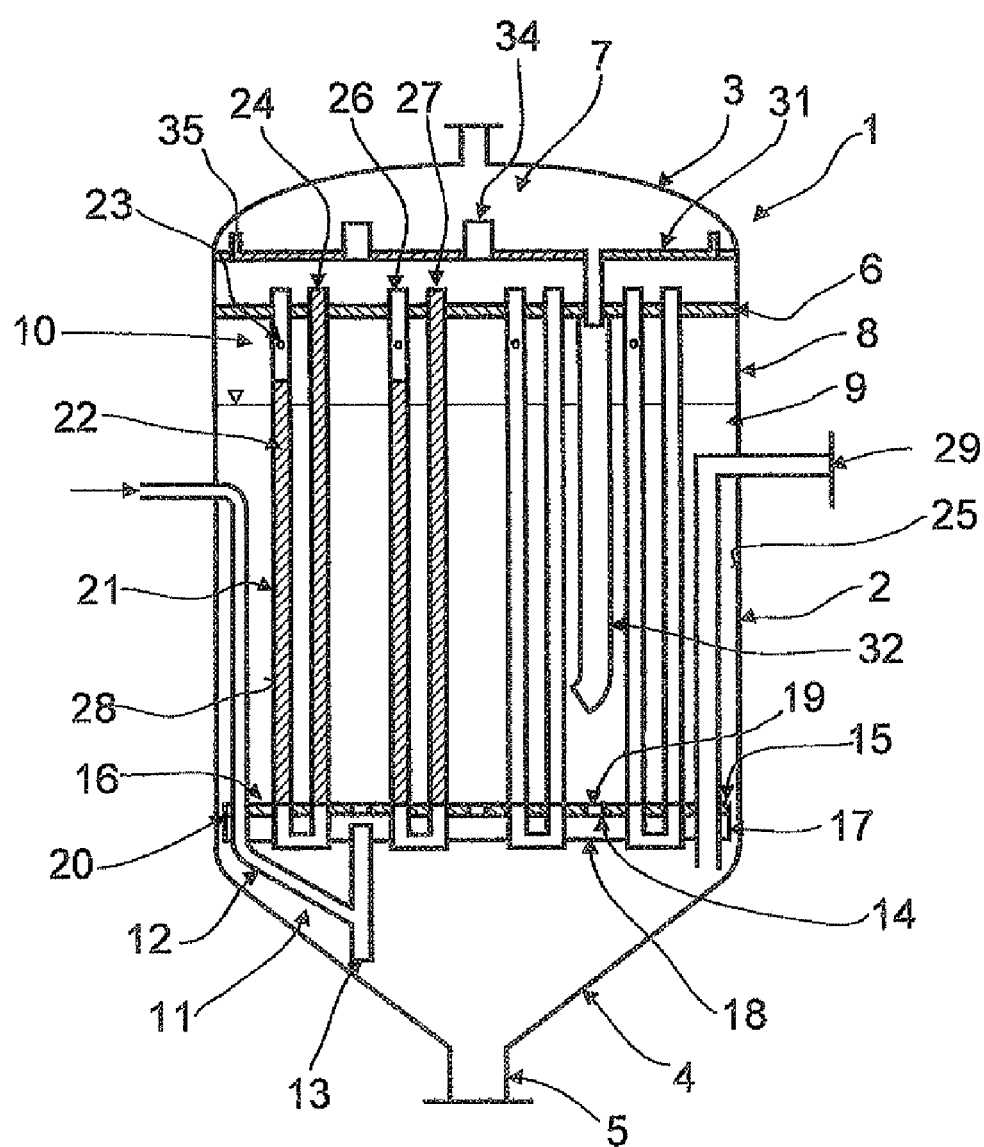

| | | | |
|---|---|---|---|
| 2,965,455 | A | 12/1960 | Maude et al. |
| 4,233,269 | A | 11/1980 | Kaye et al. |
| 5,173,285 | A | 12/1992 | Takenaka et al. |
| 5,686,056 | A | 11/1997 | Kimtantas |
| 2009/0220391 | A1* | 9/2009 | Gerlinger et al. ............ 422/187 |

FOREIGN PATENT DOCUMENTS

| | | |
|---|---|---|
| DE | 869198 | 3/1953 |
| DE | 1113446 B | 9/1961 |
| EP | 0441058 A2 | 8/1991 |
| GB | 2307191 A | 5/1997 |
| WO | WO-99/46037 A1 | 9/1999 |
| WO | WO-99/50235 A1 | 10/1999 |
| WO | WO-2007/045574 A1 | 4/2007 |

OTHER PUBLICATIONS

Ullmann's Encyclopaedie der technischen Chemie, 4-th Edition, vol. 21, 2003, Schwefelwasserstoff and Sulfide, Sulfane. p. 171, paragraph 4.3.

Ullmann's Encyclopedia of Industrial Chemistry, 6-th Edition, vol. 17, pp. 291-294.

* cited by examiner

REACTOR AND METHOD FOR PRODUCTION OF HYDROGEN SULPHIDE

PRIORITY

Priority is claimed as a national stage application, under 35 U.S.C. §371, to PCT/EP2008/050231, filed Jan. 10, 2008, which claims priority to European application 07100588.8, filed Jan. 16, 2007. The disclosures of the aforementioned priority applications are incorporated herein by reference in their entirety.

The present invention relates to a reactor and to a process for continuously preparing hydrogen sulfide $H_2S$ from hydrogen and sulfur.

In the prior art, hydrogen sulfide is prepared, for example, by the $H_2S$ process according to Girdler (Ullmann's Encyclopedia of Industrial Chemistry, Sixth Edition, 2003, Vol. 17, page 291). In this process, $H_2S$ is prepared in a non-catalytic manner from the elements sulfur and hydrogen in a column with internals and an essentially horizontally aligned, extended bottom. Hydrogen is introduced into the bottom filled with boiling sulfur, and strips sulfur into the ascending gas phase. Hydrogen and ascending sulfur react in the gas space of the column, and the heat of reaction released is withdrawn from the product gas by washing with liquid sulfur. To this end, liquid sulfur is drawn off from the bottom of the column, mixed with fresh cold sulfur and introduced at the top of the column. The product gas, which comprises substantially hydrogen sulfide, is cooled in two heat exchangers. A disadvantage is found to be that the process has to be performed under pressure and at elevated temperature. The elevated temperature leads to increased corrosion rates and material attrition on the reactor walls. In the case of a leak, relatively large amounts of poisonous $H_2S$ escape owing to the elevated pressure.

A catalytic preparation of $H_2S$ is described in Angew. Chem.; volume 74, 1962; 4; page 151. In this preparation, hydrogen is passed through an externally heated sulfur bath. The hydrogen laden with sulfur vapor passes through bores into a catalyst space. Unreacted sulfur, after leaving the catalyst space, is condensed in an upper part of the $H_2S$ outlet tube and passes via a return tube back into the sulfur bath. The catalyst space is arranged concentrically about the $H_2S$ outlet tube. A disadvantage in the process on the industrial scale is that the heat of reaction is not utilized to heat the sulfur bath, but rather the heating is effected through the jacket of the sulfur bath.

U.S. Pat. No. 2,863,725 describes a process for preparing $H_2S$ over an molybdenum-comprising catalyst, wherein gaseous hydrogen is introduced into a reactor comprising a sulfur melt and ascends through the sulfur melt in the form of gas bubbles. The amount of hydrogen introduced and the temperature of the sulfur melt (a temperature below 326° C. is specified) are adjusted such that a gas mixture which forms in a gas zone above the sulfur melt comprises the hydrogen and sulfur reactants with an excess of hydrogen above the stoichiometric reaction ratio. To utilize the heat of reaction of the exothermic reaction of hydrogen and sulfur to give hydrogen sulfide, the reaction is performed in reaction tubes positioned in the sulfur melt. The heat of reaction released is utilized to evaporate the sulfur of the sulfur melt. The hydrogen is introduced via a perforated tube into a lower region of the sulfur melt.

U.S. Pat. No. 5,173,285 utilizes a further process for prepping $H_2S$, wherein hydrogen introduced is utilized in order to strip sulfur out of the sulfur melt into the gas phase. The process comprises a two-stage preparation, wherein, in a first stage, the hydrogen introduced is reacted with the sulfur in the sulfur melt without catalyst to give $H_2S$, and, in a second stage, hydrogen introduced additionally into the gas phase completes the reaction over a catalyst. A disadvantage is found to be the residue of hydrogen remaining in the product. Gaseous hydrogen is introduced via a distributor arranged in the sulfur melt, which consists of a simple or branched tube system which is arranged largely horizontally in the sulfur melt and has passage orifices for the hydrogen. When the reactor for preparing $H_2S$ is started up, liquid sulfur can penetrate into the passage orifices and, at correspondingly low temperatures, solidify there, which blocks the passage orifices.

U.S. Pat. No. 2,876,070 discloses a process for noncatalytic preparation of $H_2S$ in an essentially horizontal vessel divided into two segments one above the other. The reaction of hydrogen and sulfur takes place largely in the gas spaces of the two segments. The first gas space of the lower, first segment is bordered by a bell which is open at the bottom and is provided with an edge extending downward. The hydrogen is fed below the bell into the first segment filled partly with liquid sulfur via a perforated tube; the hydrogen rises upward in the form of gas bubbles in this part of the sulfur melt and collects below the horizontal base of the bell in the first gas space. The hydrogen laden with sulfur reacts in the first gas space under the bell in a noncatalytic manner to give $H_2S$. The gas mixture then flows downward via the serrated edge of the bell into a second segment, i.e. into a sulfur melt present in this second segment. The gas mixture which comprises product and unconverted reactants again becomes saturated with gaseous sulfur and reacts further in the accompanying second gas space to give $H_2S$. This basically two-stage process necessitates a certain level of apparatus complexity. Another disadvantage is found to be that the gaseous hydrogen is fed via a tube provided with passage orifices into the sulfur melt of the first segment, bordered by the bell, which means that blockages of the passage orifices of the tube by penetrating sulfur, especially during the startup and shutdown phase, cannot be avoided. The new distribution of the gas mixture from the first segment via the serrated edge of the bell into the sulfur melt of the second segment leads to sparging only of the sulfur melt positioned immediately above the edge and is thus inhomogeneous. Especially in the case of large dimensions of the reactor, this form of sparging can be insufficient and relatively ineffective. Another disadvantage is found to be the multistage process, which is notable for new distribution of the hydrogen in the individual stages.

When a single inlet tube is used as a feed device, in contrast, the difficulty arises that the hydrogen is distributed inhomogeneously in the sulfur melt. In this case, large hydrogen bubbles form starting from the inlet point and strip little sulfur into the gas phase as they ascend in the sulfur melt. In order to compensate for this effect, the path of the hydrogen through the sulfur melt and hence the residence time for the loading of the hydrogen with sulfur can be prolonged. A disadvantage is the large volume that the reactor requires for this purpose.

It is accordingly an object of the present invention to provide a reactor and a process which avoid the disadvantages of the prior art and which in particular enable efficient contacting of introduced gaseous hydrogen with a sulfur melt and hence lead to a more efficient, safe and economic preparation of $H_2S$.

The achievement of the object proceeds from a reactor for continuously preparing $H_2S$ from hydrogen and sulfur, which comprises a distributor device for distributing gaseous hydrogen into a sulfur melt present at least in a lower part of the reactor. The distributor device is arranged in the sulfur melt and comprises a distributor plate which is arranged (preferably horizontally) in the reactor and has an edge extending downward. The hydrogen is distributed in the sulfur melt by means of this distributor device from a hydrogen bubble which forms below the distributor plate. The distribution can be effected exclusively or additionally via the edge of the distributor device. The hydrogen accumulated below the distributor plate disperses via the edge region of the edge extending downward into the sulfur melt by virtue of the hydrogen from the hydrogen bubble being distributed in the sulfur melt through a gap between distributor device and reactor jacket. In a preferred embodiment of the present invention, the distributor plate of the distributor device has passage orifices. The hydrogen can then be distributed via the distributor plate in the sulfur melt exclusively or additionally through the passage orifices by means of this distributor device from a hydrogen bubble which forms below the distributor plate.

The continuous preparation of $H_2S$ preferably takes place in a vertical reactor which comprises a cylindrical or prism-shaped central body surrounded by a reactor jacket which is closed at each end by a hood. The hoods may each have any suitable shape, for example be of hemispherical or conical shape.

The reactor is filled with a sulfur melt in a lower part. Gaseous hydrogen can be introduced into the sulfur melt through a feed device, in which case a reactant mixture comprising essentially gaseous sulfur and gaseous hydrogen collects above the sulfur melt in a reactant region which is in contact with the sulfur melt via a phase boundary and which is delimited at the top preferably by a subdivision such as a plate.

Gaseous hydrogen and liquid sulfur are fed to the reactor in each case via a suitable feed device below the distributor device. At a suitable point, the hydrogen sulfide product, for example at an upper hood, is passed out of the product region of the reactor.

In a preferred embodiment of the inventive reactor, gaseous hydrogen is introduced into the sulfur melt in the reactor by means of a feed device and distributed in the sulfur melt by means of the inventive distributor device.

The feed device comprises, for example, a tube which is open at both ends and is arranged vertically in the reactor, and which is arranged below the distributor device and whose upper end projects preferably into the space which is defined by the distributor plate and the edge which extends downward, into the hydrogen bubble. Projection into the space below the distributor plate and especially into the hydrogen bubble formed below it advantageously prevents inhomogeneous hydrogen introduction into the sulfur melt.

An inlet tube which runs obliquely downward, through which the hydrogen is introduced from outside the reactor, preferably opens into the vertical tube of the feed device. The feed device is advantageously configured such that sulfur which enters the tube arranged vertically can flow freely downward without blocking the feed device for the hydrogen. The hydrogen rises upward within the tube arranged vertically and collects below the distributor device.

The distributor device of the inventive reactor comprises a distributor plate (preferably having passage orifices) which is arranged substantially horizontally in the reactor and an edge extending downward. The preferably flat distributor plate extends preferably virtually over the entire cross-sectional area of the reactor, a gap remaining between reactor jacket and distributor device. The gap between the edge of the distributor device and the reactor jacket preferably has a width between 1 and 50 mm, in particular between 2 and 25 mm, more preferably between 5 and 10 mm. The shape of the distributor plate is guided by the geometry of the reactor in which it is arranged. It may preferably have a circular or polygonal shape or any other desired shape. Recesses may preferably be provided on the outer circumference of the distributor plate, which provide passage orifices, for example, for hydrogen introduction, sulfur introduction and sulfur recycling. The gap between distributor device and reactor jacket may thus have a small width, so that severe vibration of the distributor device in the reactor is avoided.

The accumulated hydrogen can be dispersed into the sulfur melt via the edge region of the distributor plate which extends downward, in which case the hydrogen from the hydrogen bubble is distributed in the sulfur melt through a gap between distribution device and reactor jacket. In a preferred embodiment of the present invention, the edge of the distributor device which extends downward has a serrated edge region, via which hydrogen from the hydrogen bubble is passed through a gap between the edge and a reactor jacket of the reactor into the sulfur melt. This allows the hydrogen accumulated below the distributor plate, dispersed into fine gas bubbles, to be dispersed in the sulfur melt through the gap.

The hydrogen introduced below the distributor device accumulates below this distributor plate to form a hydrogen bubble in the space which is defined by the edge extending downward and the distributor plate. A hydrogen bubble refers to a largely coherent accumulation of hydrogen which forms as a result of feeding more hydrogen into the reactor below the distributor device, at least in the course of startup of the reactor, than is dispersed into the sulfur melt (for example via the edge), and by continuously feeding hydrogen to maintain the hydrogen bubble during the continuous preparation of the hydrogen sulfide.

The distributor plate is preferably arranged horizontally in the reactor, so that the hydrogen bubble which accumulates below the distributor plate has virtually constant height.

The distributor plate preferably has passage orifices, through which the hydrogen accumulated below the distributor plate is dispersed in the sulfur melt disposed above the distributor plate, which advantageously prevents vibrations within the reactor through a homogeneous distribution of the hydrogen over the reactor cross section. As a result of the passage orifices in the distributor plate, the accumulated hydrogen is dispersed with uniform distribution from the hydrogen bubble into the sulfur melt disposed above the distributor plate. The number of passage orifices in the distributor plate is guided by factors including the volume flow rate of the hydrogen introduced and is preferably from 2 to 100, especially from 4 to 50, more preferably 8 to 20, per 100 standard $m^3/h$. The passage orifices may, for example, be circular or defined as slots, preferred diameters or slot widths being from 2 to 30 mm, preferably from 5 to 20 mm, more preferably from 7 to 15 mm. The passage orifices are preferably arranged regularly in the distributor plate. The areal proportion of all passage orifices, based on the area of the distributor plate, is preferably between 0.001 and 5%, preferentially between 0.02 and 1%, more preferably between 0.08 and 0.5%.

In order to ensure good mixing of the sulfur melt by the ascending hydrogen and thus to ensure very efficient stripping of the sulfur into the ascending hydrogen, the gas velocity of the hydrogen dispersed by the passage orifices is preferably from 20 to 400 m/s, especially from 50 to 350 m/s, preferably from 90 to 300 m/s, more preferably from 150 to 250 m/s.

The inventive reactor is filled with a sulfur melt in a lower part. Gaseous hydrogen is introduced into the sulfur melt through a feed device, and a reactant mixture comprising essentially gaseous sulfur and gaseous hydrogen collects above the sulfur melt in a reactant region which is in contact with the sulfur melt via a phase boundary. The reactant region is bordered at the top, for example by a subdivision of the reactor such as by a plate. In a preferred embodiment of the present invention, the plate is connected to the reactor jacket in an upper part of the reactor, preferably in the upper third, more preferably in the upper quarter, of the reactor interior.

In one embodiment of the present invention, the reactor comprises at least one contact tube, in which the conversion of gaseous sulfur and hydrogen to $H_2S$ takes place. In this case, the at least one contact tube is partly in contact with the sulfur melt.

In a preferred embodiment of the invention reactor, at least one U-shaped tube which is at least partly in contact with the sulfur melt is provided in the reactor. The reactor is therefore designed as a kind of tube bundle reactor with contact tubes which are in a U-shaped configuration. Such a U-shaped tube has two limbs which are connected to one another by a curved region at their lower end. The U-shaped tubes may each have limbs of different lengths or preferably the same length. The U-shaped tubes may have, for example, a limb diameter between 2 and 20 cm, in particular between 2.5 and 15 cm, more preferably between 5 and 8 cm. The at least one U-shaped tube is preferably arranged vertically in the reactor, the curved region being disposed at the bottom and the two ends of the limbs at the top. The provision of a reaction region in U-shaped contact tubes allows a compact design of the reactor with regard to the reactor length, since the reaction region provided for the reaction of hydrogen with sulfur to give $H_2S$ can be divided on the two limbs of one U-shaped tube each.

In connection with the present invention, "being in contact" means that a heat exchange can take place between the sulfur melt and the interior of the contact tube through the wall of the contact tube. The at least one U-shaped tube is preferably immersed partly into the sulfur melt.

In the case of simple introduction of hydrogen, for example, via a vertical inlet tube without an inventive distributor device into a sulfur melt, an inhomogeneous hydrogen distribution can arise. In the vicinity of the inlet tube, large bubbles of hydrogen rise within the sulfur melt. In other regions of the sulfur melt, there is then barely any hydrogen. As a result, vibrations of the (preferably U-shaped) contact tubes can be induced. The distributor device which is present in the inventive reactor and is configured like a bell open at the bottom therefore also serves to stabilize the contact tubes of a tube bundle in the inventive reactor.

Within the at least one (preferably) U-shaped contact tube, preference is given to arranging a catalyst for converting hydrogen and sulfur to $H_2S$, as a result of which a reaction region is provided. In connection with the present invention, the reaction region refers to that region within the U-shaped tubes in which the catalyst is disposed. The reactants are converted mainly in the reaction region which comprises the catalyst. Use of the catalyst allows the conversion to $H_2S$ to be performed at moderate temperatures and at low pressure. The catalyst is preferably arranged in the at least one U-shaped tube in the form of a fixed bed of bulk material. Suitable catalysts are, for example, catalysts comprising cobalt and molybdenum on a support, which are used as shaped bodies of any shape. For examples the diameter of the shaped bodies is from 2 to 12 mm, in particular between 3 and 10 mm, more preferably between 4 and 8 mm, and the length is preferably between 2 and 12 mm, in particular between 3 and 10 mm, more preferably between 4 and 8 mm.

In the preparation of hydrogen sulfide in a reactor having U-shaped tubes, the reactant mixture enters from the reactant region into a limb of the at least one U-shaped tube through at least one entry orifice. The entry orifice is preferably arranged in a limb of the at least one U-shaped tube above the sulfur melt. The entry orifice opens from the reactant region into one limb of the U-shaped tube. The distance between the phase boundary of the sulfur melt and the entry orifice of the U-shaped tube is preferably selected such that a minimum amount of liquid sulfur is entrained in the form of droplets with the stream of the reactant mixture into the interior of the U-shaped tubes. The distance between entry orifice and phase boundary of the sulfur melt is preferably between 0.3 and 3 m, in particular between 0.6 and 2.5 m, more preferably between 0.9 and 2 m.

In the preparation of hydrogen sulfide in the reactor having U-shaped tubes, the reactant mixture flows through the U-shaped tube along a flow path, i.e. it flows first, after entry through the entry orifice, through one limb of the U-shaped tube from the top downward, enters the second limb through the curved region of the U-shaped tube and then flows through the second limb from the bottom upward. The reactant mixture is converted mainly in the reaction region which is present within the U-shaped tube, over the catalyst preferably arranged there. In a preferred embodiment of the invention, through an exit orifice in the second limb of the U-shaped tube, the gas comprising the product enters a product region (which is preferably arranged above the sulfur melt and above the reactant region in the reactor), which is separated from the reactant region (for example by a plate).

Gaseous hydrogen and liquid sulfur are fed to the reactor via a suitable feed device. At a suitable point, the hydrogen sulfide product, for example at an upper hood, is passed out of the product region of the reactor.

In a preferred variant of the present invention, the at least one contact tube is connected to a plate in the inventive reactor. In the case of U-shaped contact tubes, the two limbs of a U-shaped tube are preferably each connected to a plate of the reactor at their upper end, the plate in turn being secured suitably in an upper part of the reactor on the reactor jacket. The plate subdivides the reactor preferably into two subregions; in particular, it determines a product region above it. The preferred securing of the at least one (preferably U-shaped) contact tube on a plate connected to the reactor jacket allows thermal longitudinal changes of the reactor and of the contact tubes independently of one another, since the tube bundle is secured on the jacket of the reactor only via the plate, so that it is possible to dispense with compensators in the construction of the reactor. The connection of the contact tubes to the plate at their upper ends advantageously achieves the effect that the contact tubes become stabilized according to gravity.

In a preferred embodiment of the present invention, a plate which divides the reactor interior into a lower subregion below it and an upper subregion above it is arranged in an upper section of the reactor, preferably close to the upper hood.

The upper subregion preferably comprises the product region, which comprises mainly the hydrogen sulfide product during the operation of the reactor. For example, in each case one limb of the U-shaped tubes is an open connection with the product region.

The lower subregion of the reactor preferably comprises the reactant region directly below the plate and, below it, a sulfur melt into which liquid sulfur is fed from an external source and/or as reflux. The (preferably U-shaped) contact tubes are preferably partly in thermal contact with the sulfur melt; some of them are preferably arranged directly within the sulfur melt, i.e. are immersed into the sulfur melt. A transfer of the heat energy released in the exothermic reaction to give $H_2S$ thus takes place via the at least one (preferably U-shaped) contact tube into the surrounding sulfur melt. The heat of reaction is utilized for an evaporation of the sulfur present therein. This thermal coupling enables an energetically favorable process in which external heat supply can be reduced considerably or is not necessary. At the same time, overheating of the catalyst can be avoided, which increases the lifetimes of the catalyst.

For a good transfer of the heat energy, preference is given to minimizing the heat resistance of a catalyst bed in the reaction region. For the conversion of the reactants to $H_2S$, preference is given to providing a multitude of catalyst-comprising (preferably U-shaped) contact tubes, so that the particular path from the core of the catalyst bed to the wall of the contact tube is low. A ratio of the sum of the cross-sectional areas of all contact tubes (or all limbs of the U-shaped contact tubes) based on the cross-sectional area of the (preferably cylindrical) reactor body is preferably between 0.05 and 0.9, especially between 0.15 and 0.7, more preferably between 0.2 and 0.5, most preferably between 0.25 and 0.4.

In order that there is sufficient thermal contact for the heat transfer from the (preferably U-shaped) contact tube into the surrounding sulfur melt, the aim is that from 20 to 100% of the outer jacket area of a particular (preferably U-shaped) contact tube along the reaction region comprising the catalyst is in contact with the sulfur melt. In order that the heat transfer into the sulfur melt functions efficiently, wherever the reaction takes place in the contact tube, the outer jacket area of the contact tube along the reaction region comprising the catalyst should be surrounded by the sulfur melt to an extent of more than 20%, preferably to an extent of more than 50%, more preferably to an extent of more than 80%. In the case of too low a fill level of the sulfur melt in the reactor and hence too low a contact of contact tube and sulfur melt, there is the risk that the heat of reaction is not removed sufficiently.

In flow direction of the reactant mixture, within the at least one (preferably U-shaped) contact tube, the reactant mixture, after entry into the contact tube, can first flow through an inert bed, in which case any entrained liquid sulfur present in the form of droplets is separated out of the reactant mixture at this inert bed. For example, a proportion of liquid sulfur in the reactant mixture comprising gaseous hydrogen and sulfur of up to 100 000 ppm by weight may be present. For the separating-out of the sulfur droplets, a proportion of the inert bed, based on the overall bed composed of inert bed and catalyst bed, of from 1 to 30%, especially from 2 to 25%, preferably from 5 to 20%, more preferably from 8 to 16%, is preferably provided in the at least one U-shaped tube. The inert bed may consist of bodies of any shape, for example of saddles or preferably of spheres which are composed of a suitable material, for example zirconium oxide or preferably aluminum oxide.

In a preferred variant of the present invention, the at least one contact tube is connected to the distributor plate of the distributor device of the inventive reactor.

In order to achieve greater stability of the (preferably U-shaped) contact tubes, the at least one contact tube may be connected to the distributor device close to its lower end, in the case of a U-shaped tube close to its lower curved region, said distributor device limiting the vibration region of the contact tube or of the corresponding tube bundle in the horizontal direction through its dimensions. In this case, the distributor device is in turn not connected directly to the reactor jacket of the reactor, but rather is connected indirectly to the reactor jacket via the connection of the contact tubes, for example to the plate. As a result, problems owing to stresses between reactor, contact tubes and distributor device caused by the thermal changes in length are avoided.

In one embodiment, the distributor plate is connected to the particular limbs of at least one U-shaped tube close to the lower end of the U-shaped tube, for example welded, a section of the U-shaped tube which comprises at least part of the curved region being disposed below the distributor plate. Since this section of the U-shaped tube is not in contact with the sulfur melt but rather projects into the region of the hydrogen bubble accumulated below the distributor device, the U-shaped tube in this section preferably does not comprise any catalyst bed. There is thus no conversion to $H_2S$ and no exothermic heat of reaction to be removed arises. Within the at least one U-shaped tube, subdivisions may be provided, which separate the region of the catalyst bed from the region without bed, although the subdivisions have to be permeable for reactants and products for the $H_2S$ preparation.

In the present invention, a feed device and the distributor device for gaseous hydrogen are preferably provided in a lower section of the reactor, for example close to the lower hood. The hydrogen introduced into the sulfur melt by means of the feed device rises in the form of gas bubbles distributed by the distributor device through the melt, which strips sulfur out of the melt, and accumulates (for example below an upper plate of the reactor) in the reactant region of the reactor as a reactant mixture which is in contact with the sulfur melt via a phase boundary. The reactant mixture comprises gaseous hydrogen and sulfur in a molar ratio which is established by virtue of the prevailing process parameters, i.e. according to temperature, pressure and the amount of hydrogen introduced, the evaporation equilibrium of the sulfur. In this context, it is possible through the selection of the process parameters to establish an excess of hydrogen or sulfur or else a molar ratio corresponding to the reaction stoichiometry, according to the desired reaction in the conversion to $H_2S$. In the present invention, preference is given to establishing an excess of sulfur in order to achieve a substantially complete reaction of hydrogen with sulfur to give $H_2S$. The sulfur excess per kilogram of $H_2S$ generated is preferably between 0.2 and 3.0, in particular between 0.4 and 2.2, preferably between 0.6 and 1.6, more preferably between 0.9 and 1.2.

In the inventive reactor, a one-stage distribution of the gaseous hydrogen via a single distributor device is preferably provided.

The invention also provides a process for continuously preparing $H_2S$ from hydrogen and sulfur, comprising introduction of gaseous hydrogen into a sulfur melt which is present at least in a lower part of the reactor. The process according to the invention comprises distribution of the gaseous hydrogen in the sulfur melt via a distributor device which is arranged in the sulfur melt and comprises a distributor plate arranged (preferably horizontally) in the reactor with an edge extending downward to form a hydrogen bubble below the distributor plate (and, if appropriate, with passage orifices) to distribute hydrogen from the hydrogen bubble in the sulfur melt via the distributor plate.

The hydrogen introduced in the process according to the invention is dispersed into the sulfur melt at the distributor device (preferably provided in the lower section of the reactor). The hydrogen is distributed via the distributor plate of the distributor device which is arranged substantially horizontally in the reactor via the edge of the distributor device and/or through passage orifices provided in the distributor plate from a hydrogen bubble accumulated below into the sulfur melt disposed above the distributor plate.

In one variant of the process according to the invention, gaseous hydrogen is distributed from the hydrogen bubble below the distributor device via the edge of the distributor device extending downward through a gap between the edge and a reactor jacket of the reactor into the sulfur melt. This distribution of gaseous hydrogen from the hydrogen bubble below the distributor device is preferably effected via a serrated edge region of the edge extending downward.

Alternatively or additionally to the distribution via the edge, the hydrogen can more preferably also be dispersed in the sulfur melt present above the distributor plate through passage orifices provided in the distributor plate of the distributor device. When there is inhibition of the passage of the hydrogen through such passage orifices, for example by sulfur deposited therein, or a larger amount of hydrogen is supplied than can be removed through the passage orifices, the hydrogen bubble accumulates in the space bordered by the distributor plate and the edge of the distributor plate which extends downward, hydrogen passes via the edge region of the edge which extends downward into the gap surrounding it and from there in the sulfur melt via the distributor device. In this case, the hydrogen from the hydrogen bubble below the distributor device passes through the gap between distributor device and reactor jacket into the sulfur melt present above the distributor device. In this way, it is ensured that the hydrogen is distributed in the sulfur melt in a sufficient amount during the continuous preparation of $H_2S$.

The process according to the invention for preparing $H_2S$ is preferably performed in the reactor at temperatures of the reactant mixture and of the reactant region comprising the catalyst of from 300 to 450° C., preferably from 320 to 425° C., more preferably from 330 to 400° C., which minimizes the corrosion stress on the materials selected for the construction elements. The temperature of the sulfur melt is preferably between 300 and 450° C., especially between 320 and 425° C., preferably between 330 and 400° C., more preferably between 350 and 360° C. The temperature in the reactant space above the sulfur bath is preferably between 300 and 450° C., especially between 320 and 425° C., preferably between 330 and 400° C., more preferably between 350 and 360° C. The product mixture which exits from the (preferably U-shaped) contact tubes into the product space preferably has a temperature between 300 and 450° C., especially between 320 and 425° C., preferably between 330 and 400° C., more preferably between 350 and 360° C. The pressures in the jacket space of the reactor and in the interior of the (preferably U-shaped) contact tubes are preferably from 0.5 to 10 bar, in particular from 0.75 to 5 bar, more preferably from 1 to 3 bar, most preferably from 1.1 to 1.4 bar absolute.

The evaporation rate of the sulfur in the present invention is preferably adjusted such that the reactant mixture comprises a sulfur excess. The excess sulfur is then fed out of the product region of the reactor with the product and subsequently separated out as a melt. This liquid sulfur can, for example, be recycled via a collecting and diverting construction arranged in the upper subregion of the reactor, comprising, inter alia, a collecting tray and a return tube which proceeds therefrom and is immersed into the sulfur melt, into the sulfur melt present in the lower subregion of the reactor. The $H_2S$ gases leaving the reactor are preferably cooled in a heat exchanger, the excess sulfur being condensed out and passed back into the sulfur melt via the collecting and diverting construction. The cooling medium used may be warm pressurized water in a secondary circuit.

Figure 2:
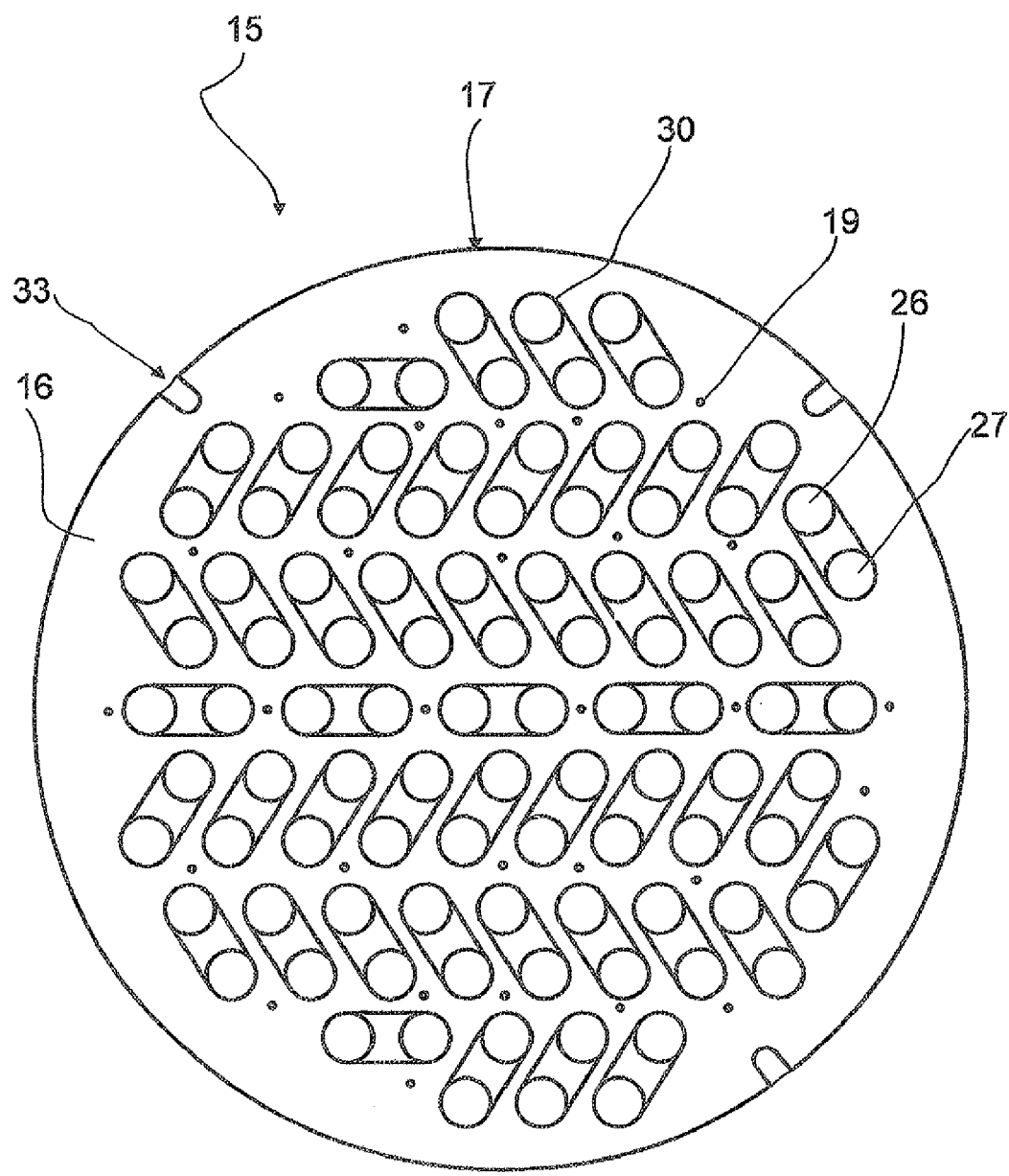

The invention will be illustrated in detail below with reference to the drawing. The drawing shows:

FIG. 1 a schematic of a preferred embodiment of an inventive reactor in longitudinal section FIG. 2 a top view of a distributor device which is arranged in a preferred embodiment of an inventive reactor.

FIG. 1 shows a schematic of a preferred embodiment of an inventive reactor in longitudinal section.

The reactor 1 is closed with hoods 3, 4 at both ends of a cylindrical body 2. At the upper hood 3, a product can be drawn off. At the lower hood 4 is disposed a discharge stop 5 in order possibly to completely discharge the contents of the reactor 1. In an upper section of the reactor 1, a plate 6 is provided, which separates an upper subregion comprising a product region 7 from a lower subregion B. The plate 6 is connected to a reactor jacket 25 of the reactor 1. The lower subregion 8 is filled partly with a sulfur melt 9 which is in contact via a phase boundary with a reactant region 10 which is bordered at the top by the plate 6. The reactant region 10 comprises mainly gaseous hydrogen and sulfur.

The hydrogen is introduced into the sulfur melt 9 via a feed device 11 into a lower section of the reactor 1, for example in the lower hood 4. The feed device 11 comprises a line 12 which runs obliquely and opens laterally into a tube 13 which is arranged vertically in the reactor 1 and is open at the top and bottom. The upper end of the tube 13 projects into a space 14 which is bordered by a distributor device 15.

The distributor device 15 comprises a distributor plate 16 arranged horizontally in the reactor 1 and an edge 17 which extends downward and has a preferably serrated edge region 18. The hydrogen introduced via the feed device 11 rises upward within the vertical tube 13 and collects below the distributor plate 16 to form a hydrogen bubble. Passage orifices 19 in the distributor plate 16 disperse the hydrogen in the sulfur melt 9 present above it, and it rises upward in the form of gas bubbles within the sulfur melt 9, which strips sulfur out of the sulfur melt 9. This forms a reactant mixture comprising gaseous hydrogen and sulfur in the reactant region 10 above the sulfur melt 9.

When the passage orifices 19 in the distributor plate 16 for hydrogen passage are blocked, for example, the hydrogen can also be dispersed from the hydrogen bubble accumulated below the distributor plate 16 via the edge region 18 into a gap 20 between the reactor jacket 25 and the edge 17 of the distributor device 15 into the sulfur melt 9, the edge region 18 preferably being serrated.

Arranged within the cylindrical body of the reactor 1 are tubes 21 which, in accordance with the invention, have a U-shaped design. The U-shaped tubes 21 are connected to the plate 6 by their two limbs 26, 27. The connection of the limbs 26, 27 to the plate 6 can be established by weld seam. The U-shaped tubes 21 are immersed partly into the sulfur melt 9, which gives rise to the possibility of direct heat exchange between the interior of the tubes 21 and the sulfur melt 9 via the outer jacket surface 28 of the tubes 21. Within each U-shaped tube 21 is arranged a fixed catalyst bed 22 which is provided in the two limbs 26, 27 of the U-shaped tubes 21.

As shown in FIG. 1, the distributor device 15 is connected to the U-shaped tubes 21, and a portion and especially the transition from one limb 26 to the second limb 27 of the particular U-shaped tubes 21 runs below the distributor plate 16 through the space 14. Since this section of the U-shaped tubes 21 projects into the accumulated hydrogen bubble and is not in direct contact with the sulfur melt 9, this section does not comprise any catalyst. The gap 20 is positioned between the distributor device 15 and the reactor jacket 25. The distributor device 15 is not connected directly to the reactor jacket 25.

In the reactor 1, the inventive preparation of hydrogen sulfide proceeds as follows. Gaseous hydrogen is passed through the feed device 11 into the sulfur melt 9 in the reactor below the distributor device 15, as a result of which a hydrogen bubble forms below the distributor plate 16. By means of the distributor device 15, the hydrogen from the hydrogen bubble is distributed in the sulfur melt 9 above it and rises upward within the sulfur melt 9 in the form of gas bubbles, which strips sulfur out of the sulfur melt 9. As a result, a reactant mixture comprising gaseous hydrogen and sulfur forms above the sulfur melt 9 in the reactant region 10. The reactant mixture passes from the reactant region 10 through one or more entry orifices 23 arranged on the circumference of a limb 26 of each of the U-shaped tubes 21 into the interior of one limb 26 of the U-shaped tube 21, flows through the catalyst bed 22 present therein, which may be supplemented by an upstream inert bed, and is converted substantially to hydrogen sulfide along the flow path within the reaction region comprising fixed catalyst bed 22. The product passes out of the second limb 27 via at least one exit orifice 24 into the product region 7 and can be collected and discharged from there via hood 3. As a result of the direct contact of the U-shaped tubes 21 with the sulfur melt 9, the heat of reaction released in the conversion to $H_2S$ is released from the fixed catalyst bed 22 into the sulfur melt 9 via the outer jacket surface 28 of the U-shaped tubes along the reaction region, and it is utilized for sulfur evaporation.

In order to keep the sulfur melt 9 at about the same height during the process, gaseous hydrogen and liquid sulfur are fed in appropriate amounts to the reactor 1 continuously via the feed device 11 and a sulfur inlet 29. Excess sulfur which is precipitated out of the product as a melt passes to a collecting and diverting construction arranged in the upper subregion of the reactor 1. This collecting and diverting construction comprises a collecting tray 31, on which inlet stubs 34 are arranged for passing the product from the product region 7 disposed below the collecting tray 31 into the product region 7 disposed below it, and which is bordered by an edge 35. The liquid sulfur separated out is collected on a collecting tray 31 which is arranged horizontally in the product region 7 of the reactor 1, and recycled via a return tube 32 immersed into the sulfur melt 9 into the sulfur melt 9 present in the lower subregion of the reactor 8. The reactor 1 is preferably insulated, so that the energy consumption is at a minimum.

FIG. 2 shows a top view on a distributor device which is arranged in a preferred embodiment of an inventive reactor.

The distributor device 15 comprises a distributor plate 16 with passage orifices 19 and an edge 17 extending downward, which is to be arranged horizontally in the reactor 1. The flat distributor plate 16 extends preferably virtually over the entire cross-sectional area of the reactor 1, leaving a gap between reactor jacket and edge 17. The shape of the distribution plate 16 is guided by the geometry of the reactor in which it is arranged. In the case presented, it is circular. The hydrogen introduced below the distributor device 15 accumulates below this distributor plate 16 to give a hydrogen bubble in the space which is bordered by the edge 17 which extends downward and the distributor plate 16. The hydrogen accumulated is dispersed through the passage orifices 19 in the distributor plate 16 in homogeneous distribution from the hydrogen bubble into the sulfur melt disposed above the distributor plate 16.

FIG. 2 illustrates one possible arrangement of passage orifices 19 in the distributor plate 16, which are arranged in circular form and distributed uniformly over the distributor plate 16. Likewise shown are passages 30 in the distributor plate 16, through which the limbs 26, 27 of the U-shaped tubes 21 pass in the inventive reactor and, for example, are connected to the distributor plate 16 by a weld seam. At the circumference of the distributor plate 16, recesses 33 are provided, in which the inlets for hydrogen 12, for sulfur 29 and the sulfur reflux tube 32 are accommodated.

REFERENCE NUMERAL LIST

1 Reactor
2 Reactor body
3 Upperhood
4 Lower hood
5 Outlet stub
6 Plate
7 Product region
8 Lower subregion of reactor
9 Sulfur melt
10 Reactant region
11 Feed device for hydrogen
12 Line
13 Tube arranged vertically
14 Space
15 Distributor device
16 Distributor plate
17 Edge
18 Edge region
19 Passage orifices
20 Gap
21 Tubes
22 Fixed catalyst bed
23 Entry orifice
24 Exit orifice
25 Reactor jacket
26 First limb
27 Second limb
28 Outer jacket surface
29 Sulfur inlet
30 Passages
31 Collecting tray
32 Return tube
33 Recesses
34 Inlet stub
35 Edge

The invention claimed is:

1. A process for continuously preparing $H_2S$ from hydrogen and sulfur, the process comprising:
    passing gaseous hydrogen into a reactor containing a sulfur melt in at least in a lower part of the reactor;
    distributing the gaseous hydrogen into the sulfur melt via a distributor device disposed in the sulfur melt, the distributor device including a distributor plate and a downward extending edge and being configured to form a hydrogen bubble below the distributor plate, wherein hydrogen from the hydrogen bubble is distributed into the sulfur melt.

2. The process according to claim 1, wherein distributing gaseous hydrogen includes distributing gaseous hydrogen from the hydrogen bubble through a gap between the downward extending edge and a reactor jacket of the reactor.

3. The process according to claim 1, wherein distributing gaseous hydrogen includes distributing gaseous hydrogen from the hydrogen bubble via a serrated edge region of the downward extending edge.

4. The process according to claim 1, wherein distributing gaseous hydrogen includes distributing gaseous hydrogen from the hydrogen bubble through passage orifices in the distributor plate.

* * * * *